United States Patent [19]

Gatins, Jr.

[11] Patent Number: 5,123,514
[45] Date of Patent: Jun. 23, 1992

[54] CLUTCH OR BRAKE SYSTEM FOR A HEAVY DUTY VEHICLE

[75] Inventor: Joseph F. Gatins, Jr., Gray, Ga.

[73] Assignee: Echlin Inc., Branford, Conn.

[21] Appl. No.: 763,360

[22] Filed: Sep. 20, 1991

[51] Int. Cl.⁵ .......................................... F16D 13/60
[52] U.S. Cl. ............................. 192/107 R; 192/107 M
[58] Field of Search ...................... 192/107 R, 107 M

[56] References Cited

U.S. PATENT DOCUMENTS

| | | | |
|---|---|---|---|
| 2,519,865 | 8/1950 | Wellman | 192/107 R |
| 2,733,797 | 2/1956 | Almen et al. | 192/107 R |
| 2,850,118 | 9/1958 | Byers | 192/107 R |
| 3,037,860 | 6/1962 | Masterson et al. | 192/107 M |
| 3,390,750 | 7/1968 | Albertson | 192/107 M |
| 3,425,524 | 2/1969 | Dewar | 192/107 R |
| 3,435,935 | 4/1969 | Warman | 192/107 R |
| 3,452,844 | 7/1969 | Lallemant | 192/107 R |
| 3,478,849 | 11/1969 | Hahm | 192/107 R |
| 3,747,712 | 7/1973 | Stout | 192/107 R X |
| 3,920,108 | 11/1975 | Ely | 192/107 R |
| 3,927,241 | 12/1975 | Augustin | 192/107 M X |
| 3,939,946 | 2/1976 | Pierre et al. | 192/107 R X |
| 3,941,221 | 3/1976 | Pringle | 192/107 R X |
| 4,049,090 | 9/1977 | Buell | 192/107 M X |
| 4,276,969 | 7/1981 | Chin et al. | 192/107 R X |
| 4,278,158 | 7/1981 | Venkatu | 192/107 M X |
| 4,799,579 | 1/1989 | Myers et al. | 192/107 M |
| 4,830,164 | 5/1989 | Hays | 192/107 R |

FOREIGN PATENT DOCUMENTS

| | | | |
|---|---|---|---|
| 1165010 | 10/1958 | France | 192/107 M |
| 1210860 | 11/1970 | United Kingdom | 192/107 M |
| 2017833 | 10/1979 | United Kingdom | 192/107 M |

*Primary Examiner*—Leslie A. Braun
*Assistant Examiner*—Andrea Pitts
*Attorney, Agent, or Firm*—Leydig, Voit & Mayer

[57] ABSTRACT

A clutch or brake system for a heavy duty vehicle is provided having an assembly which includes a shoe having an exposed surface on which is attached a carrier member. A friction liner is molded onto the carrier member. The carrier member is provided with a plurality of apertures, each having a peripheral flange embedded into a concealed surface of the liner. The attachment of the carrier member to the shoe exposed surface permits relative adjustment therebetween, when the assembly is in a braking or clutching mode, so as to compensate for any differential in coefficients of thermal expansion between the shoe and the carrier member on which the liner is molded.

12 Claims, 2 Drawing Sheets

CLUTCH OR BRAKE SYSTEM FOR A HEAVY DUTY VEHICLE

BACKGROUND OF THE INVENTION

Heretofore clutch and brake systems for heavy duty vehicles have been beset with one or more of the following shortcomings, which are described primarily in the context of a brake system but have like application to clutch systems as well which is apparent to those skilled in the art:

a) there is an inordinate amount of thermal expansion of the brake drum during the braking mode due to heat transfer from the brake shoe resulting in an undesirable and unsafe brake fading condition; b) where disc brakes are utilized in the system, the heat generated during the braking mode is transferred to the hydroscopic brake fluid causing the latter to boil producing gas bubbles entrapped within the system thereby seriously affecting the responsiveness of the disc brake shoes to the travel of the brake pedal; c) severe stress and fatigue are created within the liner and shoe due to the differential in the coefficient of thermal expansion between the liner and shoe; d) excessive wear of the liner occurs because of the mode of attachment of the liner to the shoe; e) there is ineffective noise and temperature shielding from the shoe; f) the system embodies an inordinate number of component parts some of which are of costly and complex design; and g) servicing of the system is a costly, difficult, time consuming and labor intensive operation.

SUMMARY OF THE INVENTION

An improved clutch or brake system has been provided which readily avoids the aforenoted shortcomings of the prior systems.

The improved system may be utilized in a variety of vehicles.

Because of the extensive contact area which exists between the carrier member and the molded liner assembled therewith, the improved system is possessed of superior shear strength in the plane of stress induced during the braking mode.

The improved system utilizes a thermal shield, which is positioned between the shoe and the carrier member/liner assembly prior to the assembly being secured to the shoe; thereby, in addition to the enhanced static, dynamic and fatigue strength properties of the system, highly desirable temperature and noise shielding from the brake shoe itself results during the braking mode.

Further and additional advantages and virtues possessed by the improved system will become apparent from the description, accompanying drawings and appended claims.

In accordance with one embodiment of the invention an improved clutch or brake system is provided which includes a shoe having a first coefficient of thermal expansion; a moldable friction liner aligned with a surface of the shoe; and a carrier member backing and being assembled with the liner. The carrier member/liner assembly is possessed of a second coefficient of thermal expansion. The assembly is attached to the shoe surface for limited relative adjustment with respect thereto so as to compensate for any differential in thermal expansions which might occur between the shoe and carrier member/liner assembly during the braking mode and thus relieve potential stress buildup within the system.

DESCRIPTION OF THE DRAWING

For a more complete understanding of the invention reference is made to the drawings wherein.

DESCRIPTION

Figure 1:
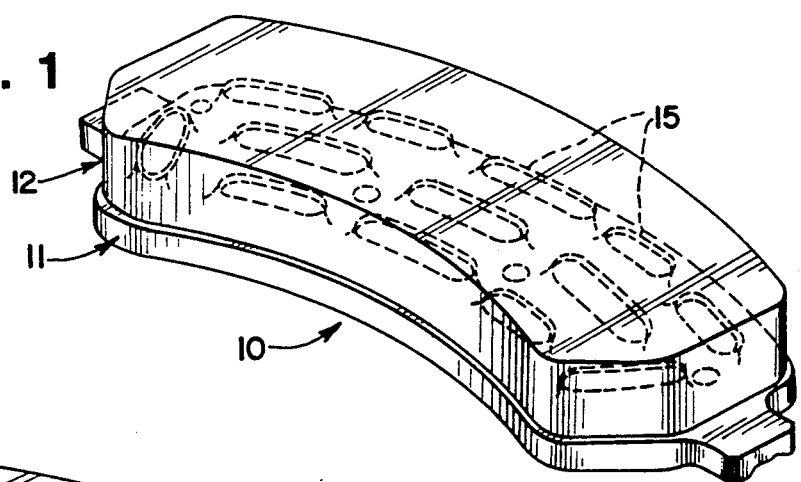
FIG. 1 is a fragmentary perspective view of one embodiment of the improved system removed from a heavy duty vehicle.
Figure 2:
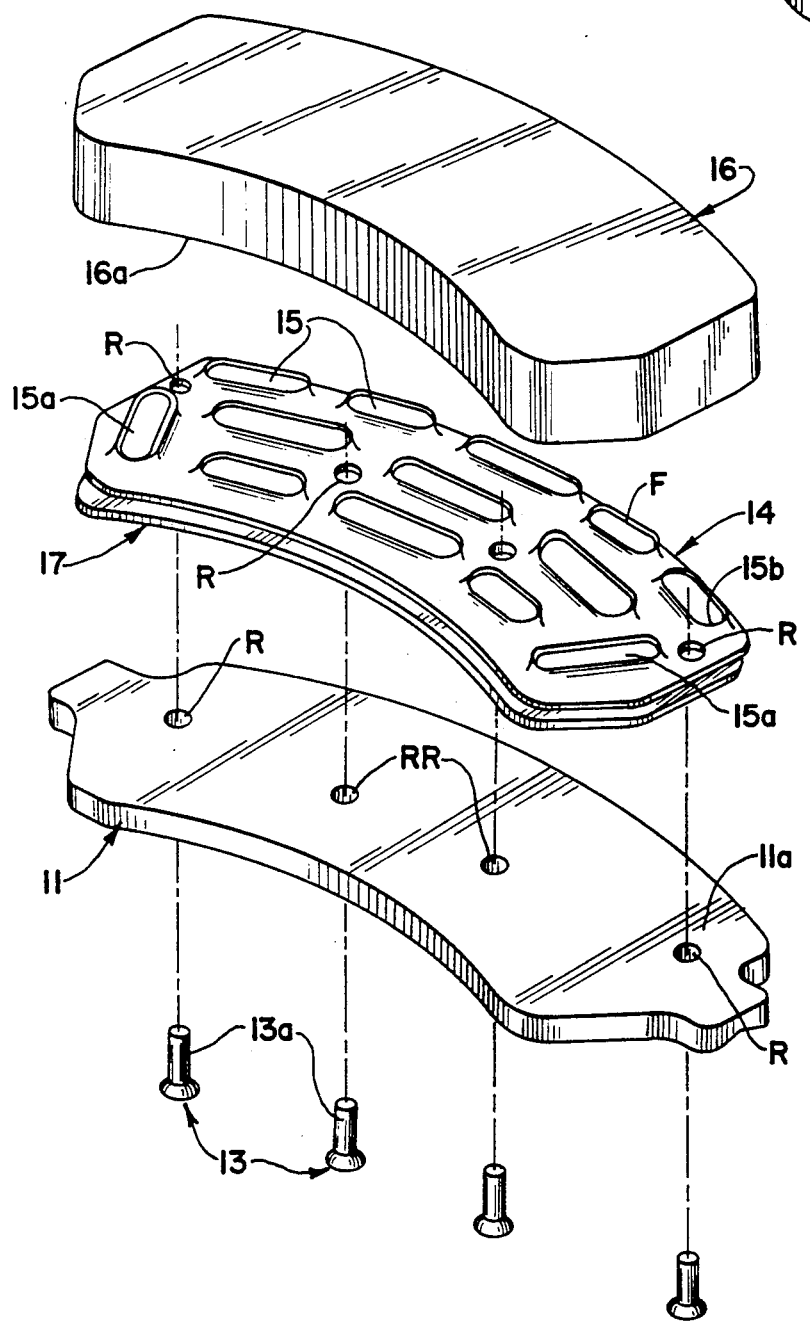
FIG. 2 is similar to FIG. 1 but showing the system components in exploded relation.

Referring now to the drawings and more particularly to FIGS. 1 and 2 an improved clutch or brake system 10 is shown which is adapted for use on heavy duty vehicles including automobiles, trucks, aircraft, buses, recreation vehicles and the like. The system 10 is capable of being utilized with either disc or drum type brakes which are either hydraulically or pneumatically actuated. The system 10 as illustrated includes a shoe 11 formed of a durable metal or a high strength composite material. The shape and size of the shoe will depend upon the type and operating capabilities of the vehicle on which the system is to be installed. The shoe 11 has an exposed surface 11a to which a liner assembly 12 is attached by a plurality of rivets 13; see FIG. 2. The shoe is possessed of a first coefficient of thermal expansion.

Figure 4:
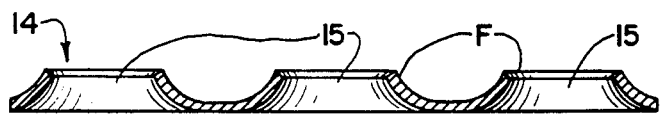
FIGS. 4 and 5 are enlarged fragmentary sectional views taken respectively along lines 4—4 and 5—5 of FIG. 3.
Figure 5:
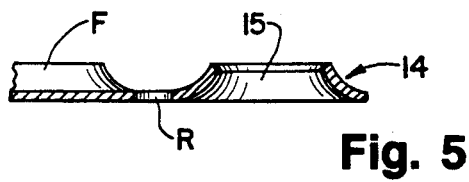
Figure 6:
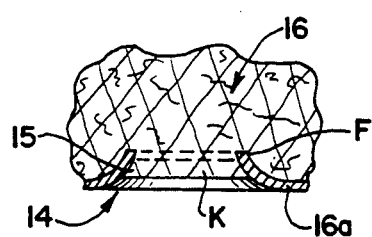
FIG. 6 is an enlarged fragmentary sectional view taken along line 6—6 of FIG. 3 and showing the carrier member assembled with the molded brake liner.

The liner assembly 12 is provided with an apertured carrier member 14, sometimes referred to as an attachment plate. The carrier member is formed of a relatively thin gauge metal (e.g., 18ga to 22ga) and has a peripheral configuration akin to that of the shoe exposed surface. The member 14 is provided with a plurality of elongate apertures 15 arranged in substantially end to end relation and forming three generally parallel rows I, II and III; except, at opposite ends wherein a transversely extending elongate aperture 15a and a rivet hole R are formed. Each elongate aperture 15 has rounded ends 15b and is delimited by a continuous flange F which flares away from the shoe exposed surface 11; see FIGS. 4 and 5, and penetrates a short distance into the back side 16a of the liner 16 of a friction material, which is molded thereto; see FIG. 6. While the flared flanges F present a low profile there is nevertheless a strong bond established between the carrier member 14 and the liner 16 because during molding of the liner, portions thereof flow through the elongate apertures 15 and 15a and form keys K which interlock with the flared surfaces of the apertures when the friction material hardens; see FIG. 6. Because of the number, location and shape of the apertures 15 and 15a there is extensive contact area between member 14 and liner 16; thus, resulting in the liner assembly 12 being possessed of superior shear strength in the plane of stress induced during the braking mode. The shear strength is limited only by the method of attachment of the assembly to the shoe exposed surface.

Figure 3:
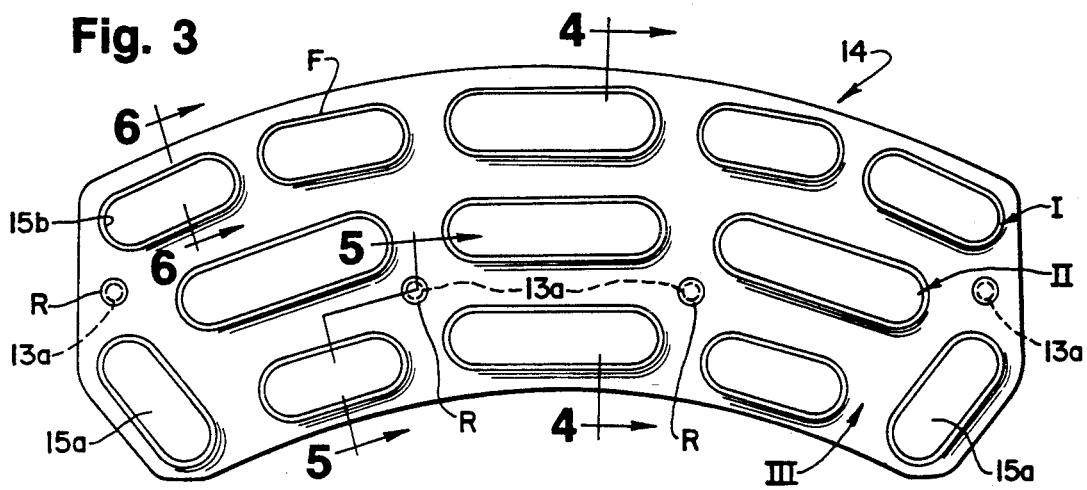
FIG. 3 is an enlarged top view of the carrier member shown in FIG. 2 and with the shanks of the attaching rivets in phantom lines.

As seen in FIG. 3, carrier member 14 is provided with a plurality of rivet holes R which are arranged in a predetermined pattern. The pattern corresponds to the pattern of rivet holes RR formed in shoe 11; see FIG. 2. The size and shape of holes RR correspond substantially to the cross-sectional configuration of the shanks 13a of the rivets. The size and shape of holes R, on the other hand, are oversized relative to the rivet shanks so as to permit limited relative movement between carrier member/liner assembly 12 and shoe 11 during the braking mode. Due to a differential in the coefficients of thermal expansion between the assembly 12 and shoe 11, the limited relative movement permitted by the oversized holes R compensated for such differential and thus, avoids undesirable induced stress and fatigue buildup within the components.

Another serious problem which previously existed in many prior art systems related to inadequate shielding of the noise and heat generated at the interface between the shoe and liner during the braking mode. This thermal problem frequently created a serious and unsafe condition known as "brake fading". Such condition occurs normally in a drum-type braking system wherein the heat generated during the braking mode is transmitted to the drum itself causing the later to expand thus, necessitating greater force being applied to the brake pedal in order to actuate the shoe to a required braking relation with the drum. A similar situation oftentimes occurs in prior disc-type braking systems wherein a hydroscopic braking fluid is employed as a means for actuating the braking discs. In such a situation the brake fluid is heated to a boiling state by the heat generated during the braking mode. When boiling of the brake fluid occurs, air bubbles become entrapped within the system thereby rendering the actuation of the discs less responsive to the distance of travel of the brake pedal.

Besides the problems caused by the heat generated during the braking mode, there is also the problem of noise created in prior braking systems when in the braking mode.

The improved system 10 resolves both the heat and noise problems by the utilization of a layer 17 of a thermal/acoustic barrier material (e.g., silicone impregnated compressed Kaolin fiber) which remains stable under varying operating condition. Layer 17 may be in the form of a pad per se or in the form of a thin pad sandwiched between two thin metal sheets, not shown. In either case, the layer 17 is positioned between the exposed surface 11a of the shoe and the underside of the carrier member/liner assembly 12. Layer 17 preferably covers the entire shoe surface 11a and is provided with at least the same number of rivet holes as provided in the shoe.

The arrangement and configuration of the apertures 15 and 15a and the rivet holes R in the carrier member 14 may vary from that shown without adversely affecting the scope of the disclosed invention. Under any circumstances it is important that the apertures not materially weaken the strength and durability of the carrier member. Furthermore, the flanges F delimiting the apertures must provide maximum contact area between the carrier member and the liner molded thereto and at the same time provide a low profile. The improved system embodies a minimum number of component parts, is easy to manufacture and install, and effectively overcomes the aforenoted serious problems besetting prior systems of this general type.

I claim:

1. In a clutch or brake system for a heavy duty vehicle, an assembly comprising a shoe having an exposed surface, said shoe having a first predetermined coefficient of thermal expansion; a moldable friction liner having an outer surface and an inner surface; an apertured carrier member for backing and being affixed to and in registered relation with said liner inner surface and cooperating with said liner to form a sub-assembly having a second predetermined coefficient of thermal expansion; and fastening means having portions thereof cooperating with corresponding portions of said carrier member for attaching said sub-assembly to said shoe surface, the cooperating portions of said fastening means and said carrier member being dimensioned to permit relative adjustment between said shoe exposed surface and said sub-assembly to compensate for any differential between said coefficients of thermal expansion.

2. The assembly of claim 1 wherein said carrier member is formed of a thin metallic material and is provided with a plurality of elongate apertures, each aperture being provided with rounded end portions and a continuous peripheral flange flared away from the shoe surface and into the inner surface of said friction liner molded thereto, portions of said friction liner extending through the carrier member apertures and embedding the aperture peripheral flanges in said friction liner.

3. The assembly of claim 2 wherein the fastening means includes a plurality of rivets disposed intermediate predetermined apertures of said carrier member.

4. The assembly of claim 1 wherein thermal insulative means is interposed between said shoe surface and said sub-assembly.

5. The assembly of claim 4 wherein the thermal insulative means is a thin pad of insulative material having a peripheral configuration corresponding substantially to the peripheral configuration of said shoe surface.

6. The assembly of claim 4 wherein the thermal insulative means has a noise attenuating characteristic.

7. In a clutch or brake system for a heavy duty vehicle, an assembly comprising a metallic shoe having an exposed substantially planar surface; and an apertured metallic carrier member for supportingly backing a friction liner, the latter having an outer surface and an inner surface, said carrier member being riveted to said shoe surface so as to permit, when the assembly is in a braking or clutching mode, relative adjustment between said carrier member and said shoe surface to compensate for differences in thermal expansion thereof, said carrier member being provided with a plurality of apertures, each having a peripheral flange extending angularly into the inner surface of said friction liner whereby portions of said liner extend through the carrier member apertures and cooperate therewith to form keys locking said liner to said carrier member.

8. The assembly of claim 7 wherein the peripheral flanges form low profile substantially fustoconical protrusions extending into the liner inner surface.

9. The assembly of claim 8 wherein said protrusions are substantially elliptical in cross section.

10. The assembly of claim 7 including a layer of sound insulation between the shoe surface and the carrier member.

11. The assembly of claim 7 including a layer of thermal insulation between the shoe surface and the carrier member.

12. The assembly of claim 7 wherein the carrier member is provided with rivet holes which are oversized relative to shanks of the rivets securing the carrier member to the shoe surface.

* * * * *